(12) United States Patent
Lacombe et al.

(10) Patent No.: US 8,119,908 B2
(45) Date of Patent: Feb. 21, 2012

(54) ELECTRICITY TRANSMISSION DEVICE AT HIGH CURRENT AND HIGH FREQUENCY

(75) Inventors: Jacques Lacombe, Pujaut (FR); Patrice Brun, Saint-Michel-d'Euzet (FR); Thierry Flament, Jouy En Josas (FR); Eric Chauvin, Fontenay Sous Bois (FR); Antony Prod'Homme, Sevres (FR)

(73) Assignees: Areva NC, Paris (FR); Commissariat a l'Energie Atomique, Paris (FR)

( * ) Notice: Subject to any disclaimer, the term of this patent is extended or adjusted under 35 U.S.C. 154(b) by 736 days.

(21) Appl. No.: 12/278,743

(22) PCT Filed: Feb. 9, 2007

(86) PCT No.: PCT/EP2007/051236
§ 371 (c)(1),
(2), (4) Date: Dec. 15, 2008

(87) PCT Pub. No.: WO2007/090874
PCT Pub. Date: Aug. 16, 2007

(65) Prior Publication Data
US 2011/0056719 A1    Mar. 10, 2011

(30) Foreign Application Priority Data

Feb. 10, 2006 (FR) ..................................... 06 50490

(51) Int. Cl.
*F16L 11/12*     (2006.01)
*H01B 7/00*     (2006.01)
*H01B 17/00*    (2006.01)
*H02B 1/00*     (2006.01)
*H02B 1/56*     (2006.01)
*H05K 7/20*     (2006.01)

(52) U.S. Cl. .......................... 174/47; 361/676; 361/699

(58) Field of Classification Search ................. 174/68.1, 174/99 R, 100, 47; 373/129; 361/600, 601, 361/611, 613, 676, 698, 699
See application file for complete search history.

(56) References Cited

U.S. PATENT DOCUMENTS 2,057,273 A * 10/1936 Little .................... 174/129 B
2,885,647 A * 5/1959 Winkler ...................... 439/164
2,932,682 A * 4/1960 Barrass .......................... 174/19
(Continued)

FOREIGN PATENT DOCUMENTS

DE    19740912 C1    4/1999
(Continued)

OTHER PUBLICATIONS

International Search Report for International Patent Application No. PCT/EP2007/051236 (May 22, 2007).

*Primary Examiner* — Lisa Lea Edmonds
*Assistant Examiner* — Xanthia C Cunningham
(74) *Attorney, Agent, or Firm* — Nixon Peabody LLP

(57) ABSTRACT

The electricity transmission device comprises prolonged rigid conductors made of copper, and also a connector comprising a network of flexible elements, such as brazed tubes with cooling channels for the conductors, that enables angular displacements between the successive segments and therefore gives a flexibility absorbing small displacements of the device. A lifting manoeuvre system is associated with the segments. The segments may be joined to other elements of the device through connections with jaws enabling slipping.

14 Claims, 5 Drawing Sheets

U.S. PATENT DOCUMENTS

Figure 1:
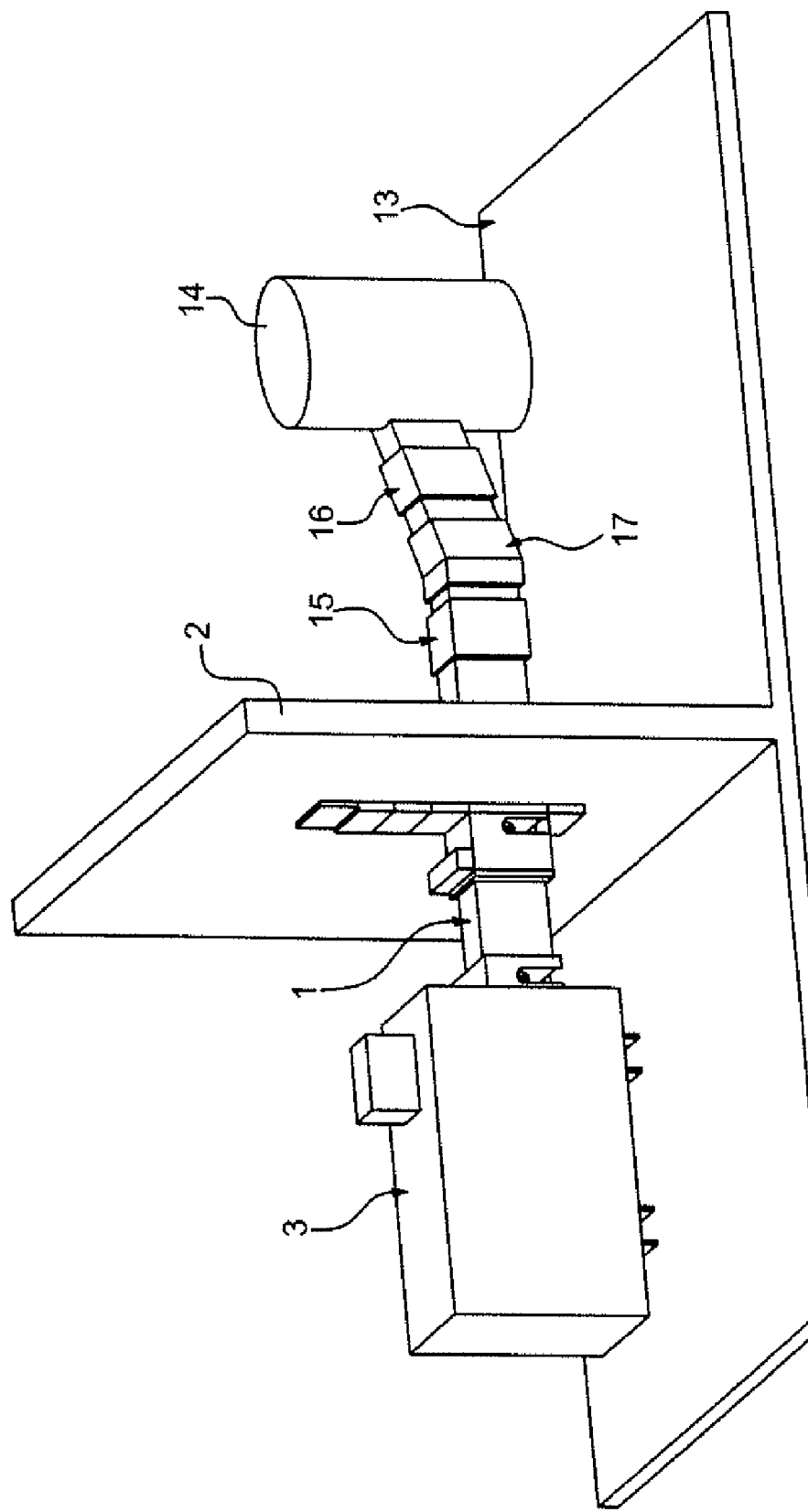

| | | | | |
|---|---|---|---|---|
| 3,020,329 A | * | 2/1962 | Deans | 174/16.2 |
| 3,021,380 A | * | 2/1962 | Barrass | 174/15.7 |
| 3,197,603 A | * | 7/1965 | Kasper et al. | 219/660 |
| 3,265,803 A | * | 8/1966 | Grove | 174/15.7 |
| 3,646,245 A | * | 2/1972 | Swerdlow | 174/21 JS |
| 3,898,707 A | | 8/1975 | Trageser | |
| 4,007,325 A | * | 2/1977 | Bowles et al. | 373/119 |
| 4,876,413 A | * | 10/1989 | Vermilyea | 174/15.4 |
| 5,044,970 A | * | 9/1991 | Reuter | 439/196 |
| 6,433,450 B1 | * | 8/2002 | Chao | 310/113 |
| 7,554,817 B2 | * | 6/2009 | Nakakita et al. | 361/775 |
| 7,563,981 B2 | * | 7/2009 | Ichikawa et al. | 174/72 A |
| 2007/0267209 A1 | * | 11/2007 | Bally et al. | 174/47 |

FOREIGN PATENT DOCUMENTS

| | | |
|---|---|---|
| FR | 2258075 | 3/2009 |
| GB | 2051461 A | 1/1981 |

\* cited by examiner

ELECTRICITY TRANSMISSION DEVICE AT HIGH CURRENT AND HIGH FREQUENCY

CROSS REFERENCE TO RELATED APPLICATIONS OR PRIORITY CLAIM

This application is a national phase of International Application No. PCT/EP2007/051236, entitled "DEVICE FOR TRANSPORTING ELECTRICITY AT HEAVY CURRENT AND HIGH FREQUENCY", which was filed on Feb. 9, 2007, and which claims priority of French Patent Application No. 06 50490, filed Feb. 10, 2006.

DESCRIPTION

Technical Field and Prior Art

The subject of this invention is a device for transmission of electricity at high current and high frequency.

Although there are many types of electricity conducting devices, all known devices designed for use at high currents and high frequencies use large rigid conducting elements usually made in the form of elongated copper bars or plates.

Difficulties occur in some applications in which the conducting device is required to connect a power supply device to an instrument that can move slightly or can be displaced. This situation arises in vitrification devices in which electrical current is used to supply power to the electromagnetic induction means arranged around a crucible and that is designed to melt material that will be placed in it, and in which the crucible can sometimes be moved. In the vitrification of radioactive waste application, the crucible is behind a biological protection wall that the conducting device must pass through without clearance to prevent ionising radiation leaks, and the dilemma arises of how to place a conducting device with rigid elements with an imposed position and an imposed orientation at the location of the crossing through the wall, but which must be variable to follow the displacements of the instrument to which the conducting device is connected behind the wall, the problem being particularly difficult because this instrument can only be placed by remote manipulation means that are not sufficiently precise to prevent positioning errors.

In its most general form, the invention relates to an electricity transmission device comprising at least one electricity conducting element made essentially from an elongated rigid section, the conducting element comprising two segments separated by a connection composed of flexible electricity conducting elements, characterised in that it comprises a joint support device for the two segments; and the flexible elements are metallic tubes brazed onto the segments of the conducting element.

The flexible elements conduct electricity between segments at the price of a loss of energy; this lost is modest due to the shortness of the flexible elements.

Therefore the flexible elements form a hinge in the middle of the conducting device which deforms without breaking, following the displacements of the instrument. The joint segments support element prevents accidental excessively different displacements of segments while they are being manipulated, which would cause breakage of the flexible elements joining them together.

The combination of largely rigid metal tubes to join segments and the joint segments support is justified in the very frequent situation in which segments have to be cooled by a liquid; the tubes are then used not only for the electric connection, but also for the hydraulic connection by joining channels of segments through which this liquid circulates.

Prior art (for example GB-A-2 051 461) illustrates rigid electrical conductors joined by metallic braids or very flexible elements but are not leak tight and therefore do not allow cooling liquid to circulate from one segment to the next. In this case, flexible ducts have to be added with much more complicated connectors than simple brazing.

Other more particular arrangements of the invention are used to apply it to the technical context for crossing through a biological protection wall into which a portion of the device has to be embedded with no clearance. It may be in the form of the third segment provided with cooling channels, said cooling channels being made on the surface of the third segment and with a wave shape, the third segment comprising ionising radiation screens aligned with straight line portions of cooling channels, an electromagnetic shielding cover comprising an outside adjustment surface that surrounds the third segment, and a filling material that extends between the third segment and the electromagnetic shielding cover.

Other arrangements are used to move the instrument associated with tension or compression of the device rather than bending. Thus, it will be possible for the conducting element to comprise at least one third segment (possibly corresponding to the third segment mentioned above) extended with another of the segments, and a connector for connecting segments comprising jaws pressing said segments prolonging each other together.

It is also useful to allow for the possibility of disassembling successive segments of the transmission device provided with cooling channels: they are then advantageously provided with separable connectors, and even more advantageously with valves self-closing in the disassembled state.

Figure 2:
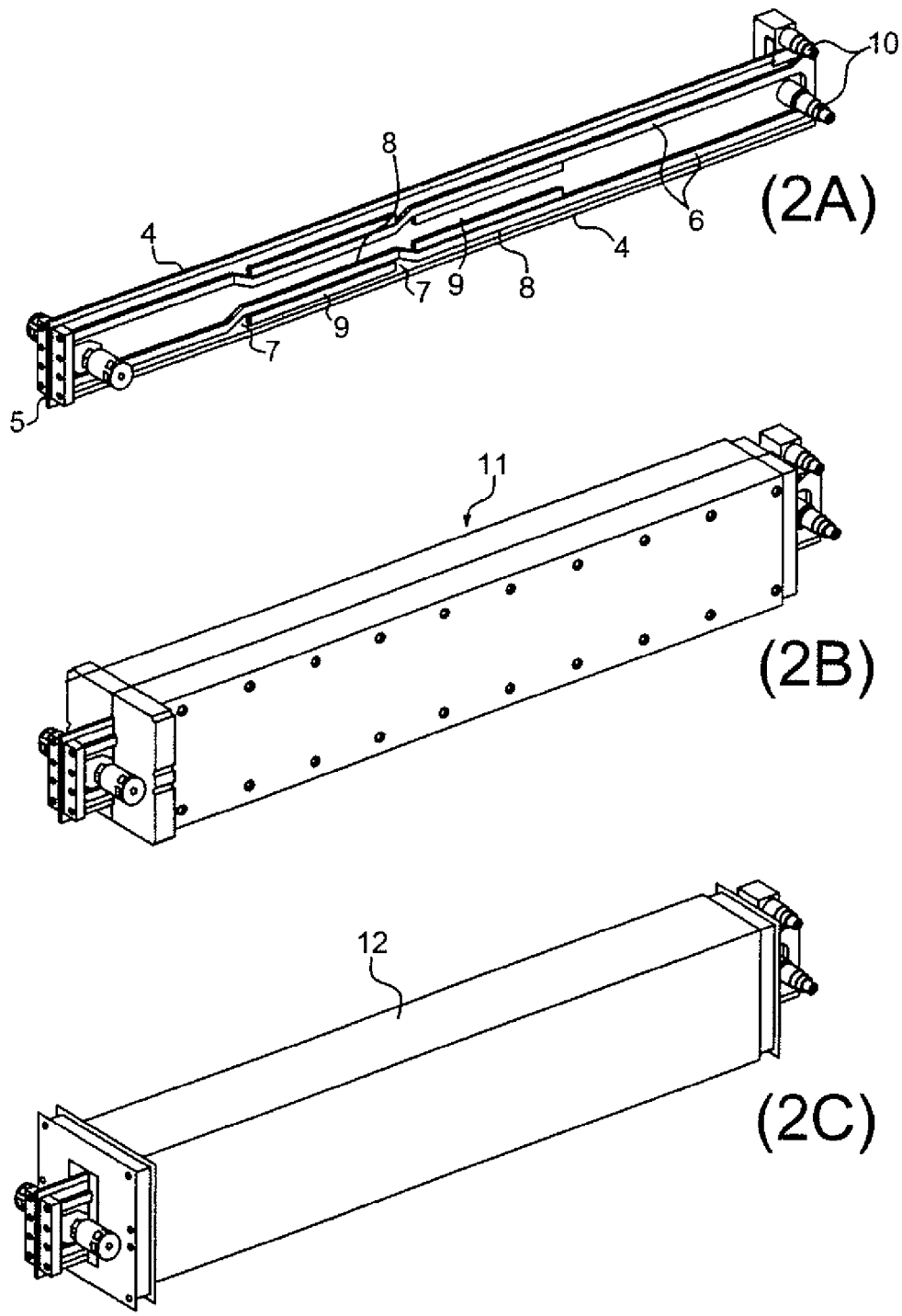
Figure 3:
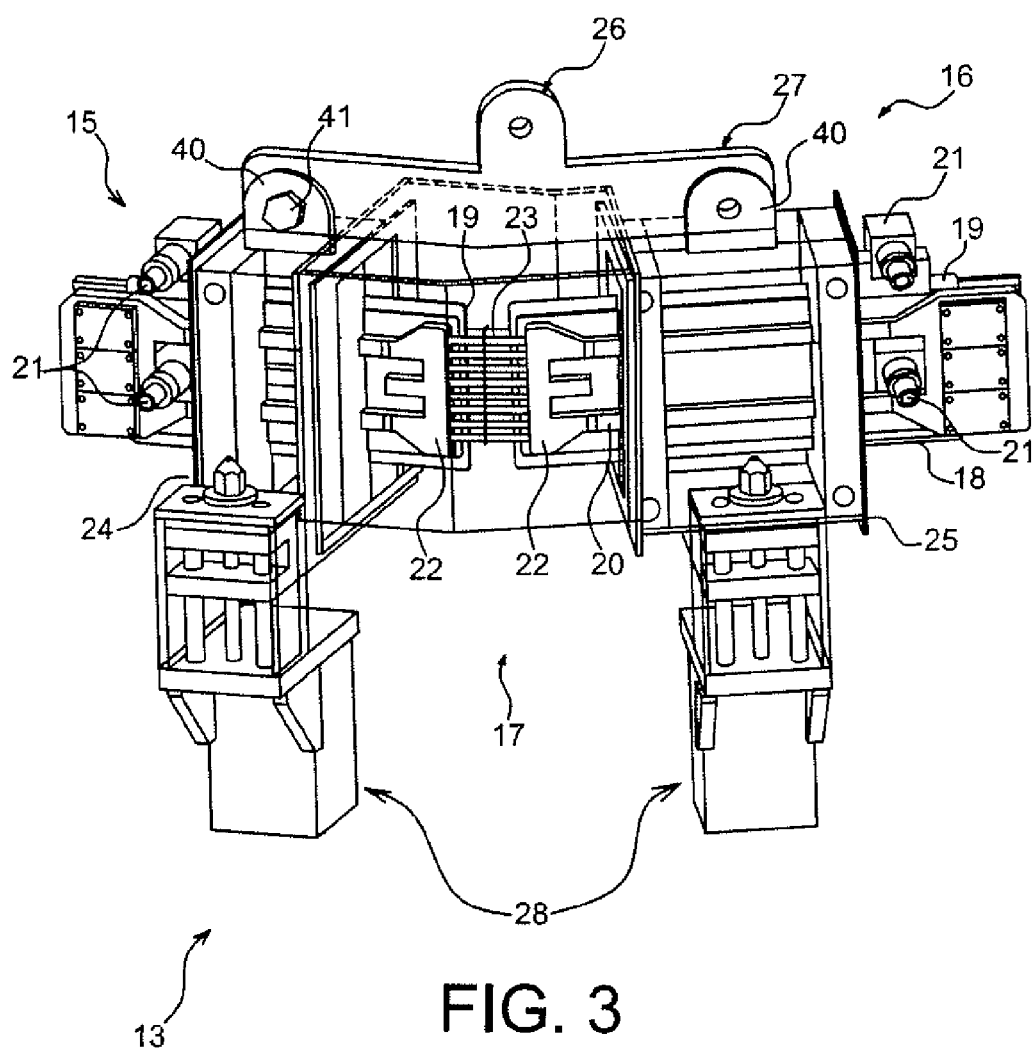
Figure 4:
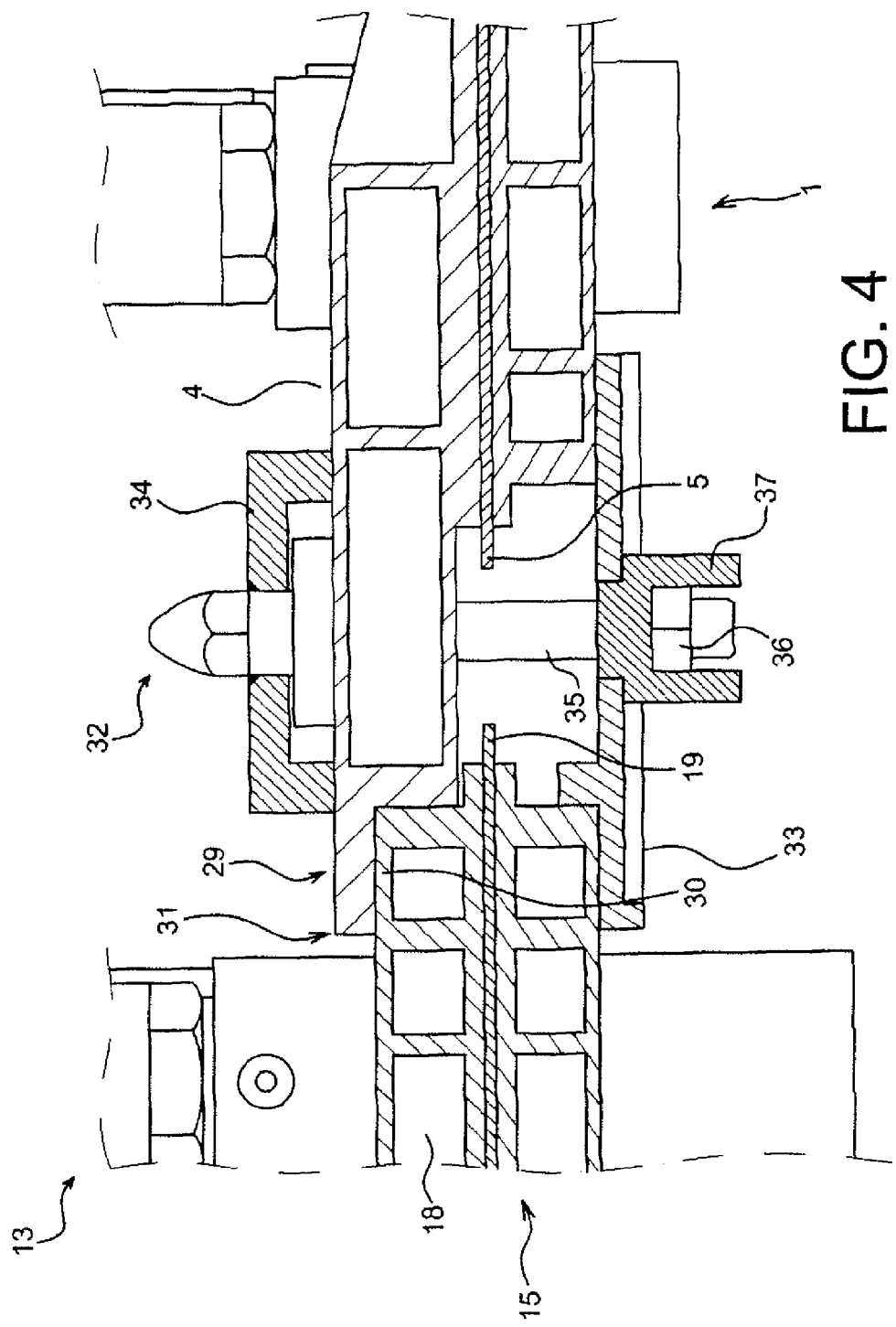
Figure 5:
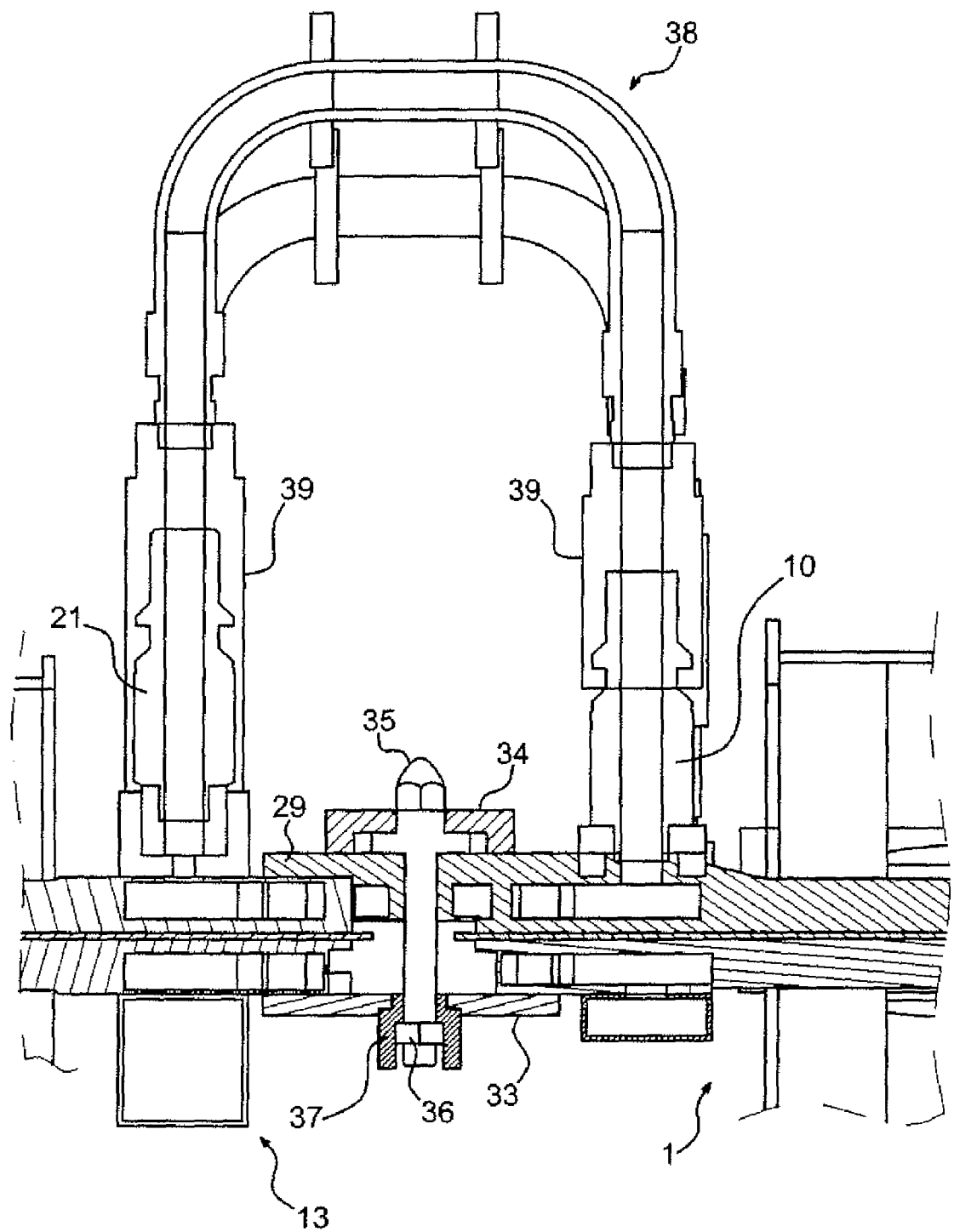

Other arrangements, possibly more secondary, will also become clear after reading the following description with reference to the figures, in which:

FIG. 1 shows a preferred application of the invention,
FIG. 2 shows a rigid segment of the device,
FIG. 3 shows the flexible portion of the device,
and FIGS. 4 and 5 show mechanical, electrical and hydraulic connections of segments to cooled conductors.

In one envisaged main application, the electricity transmission device, as shown in FIG. 1, comprises a rigid portion 1 passing through a biological protection wall 2 through holes in the wall provided for the passage of various transmissions or various object transfers between the chamber delimited by the biological protection wall 2 and the outside. The rigid portion 1 is connected to an electricity supply 3. As shown in FIG. 2, it comprises one or several conducting elements 4 (two in this case) in the form of elongated plates made of copper, and separated from each other by an intermediate insulating sheet 5. The conducting elements 4 are provided with cooling channels 6 with projecting relief on their outside surface. The cooling channels 6 are sinuous and more precisely are composed of baffles 7 separating straight portions 8. The copper screens 9 are connected to conducting elements 4 along the alignment of the straight portions 8, and they project with the same relief as the cooling channels 6 on the conducting elements 4. This arrangement makes it possible to have copper screens 9 stop the ionising radiation that would pass through the biological protection wall 2, following straight portions 8 of the cooling channels 6, particularly when the cooling liquid that would usually pass through them has been drained. The cooling channels 6 end up on the connecting end pieces 10 that will be described later and extend in a direction transverse to the conducting elements 4. The rigid portion 1 also comprises a polymer shell 11 formed from two assembled halves surrounding the conducting elements 4 to fill in the remainder of the section of the hole in the biological protection wall 2 in which the rigid portion 1 is engaged; finally, an electromagnetic shielding cover 12 surrounds the assembly.

One important element of the invention is located in another portion of the electricity transmission device, which connects the rigid portion 1 already described on the other side of the protection wall 2, to a vitrification crucible 14 that may be displaced by a small distance. This other portion that is shown in FIG. 3, is a flexible portion 13 that comprises two successive segments 15 and 16 attached by a flexible connector 17. Like the rigid portion 1, each of the segments 15 and 16 comprises a pair of conducting elements 18 made of elongated copper plates and an intermediate insulating sheet 19 that separates them. The conducting elements 18 are also provided with cooling channels 20 extending longitudinally along them and that finish at the far ends of the segments 15 and 16 on connectors 21 corresponding to the connectors 10 already encountered, and at the ends of segments 15 and 16 facing each other, on junction channels 22 extending transverse to the conducting elements 18.

The junction ducts 22 are connected to each other by flexible metallic tubes 23 (made of stainless steel or copper) that are used as a mechanical, electrical and hydraulic junction between segments 15 and 16, allowing electricity and water to pass through the cooling channels 20. The number of flexible tubes 23, their arrangement and length are determined so as to minimise the inductance of the segment. No other part electrically connects the segments 15 and 16. The essential property of the flexible tubes 23 is to resist bending produced by the angular displacement of the segments 15 and 16 with respect to each other and therefore to absorb position variations of the vitrification crucible 14. The electrical insulation between the fluid tubes 23 connected to the corresponding conductors 18 is maintained by intermediate insulating sheets 19 that project from the conducting elements 18 and separate them from each other over part of their length. In any case, a sufficient spacing between the flexible tubes 23 may be chosen to eliminate any risk of creating electrical arcs by making sure that the inductance of the line is not increased excessively. It is also observed that bending of flexible tubes 23 within moderate limits does not break the brazing through which they are assembled to the junction channels 22. Segments 15 and 16 are surrounded by electromagnetic shielding covers 24 that also extend around the flexible tubes 23 and include portions overlapping each other, thus preventing any leak of the electromagnetic flux to the outside.

Precautions are taken to prevent the flexible connector 17 being broken by a clumsy manipulation. Segments 15 and 16 are also connected by a pulley block 26 provided with a swing arm 27 at the ends of which segments 15 and 16 are suspended by articulated connections comprising a tab 40 fixed to the corresponding segment 15 or 16 and a bolted pin 41 (only one of which is shown). When the flexible portion 13 has to be moved, it is raised by a remote manipulation machine not shown gripping the pulley block 26: the swing arm 27 is balanced as a function of the masses of the subassemblies 15 and 16 of the flexible portion 13 connected to the segments, they remain at the same level and the flexible tubes 23 are practically unloaded. Segments 15 and 16 are also provided with stands 28 to keep them at an identical and invariable height on a common support when the conducting portion 13 is released. When the segments 15 and 16 are put into place, the swing arm 27 is disassembled and removed by unscrewing the bolted pins 41 so that the position and the shape of the flexible segment 13 can be adjusted.

We will now describe other elements of the device regarding the connection between the rigid portion 1 and the flexible portion 13. Refer to FIGS. 4 and 5. One of the conducting elements 4 of the rigid portion 1 comprises a protuberance 21 fitted with a tab support 31 on the side of this conducting element 18, through a side face 30. Thus, the flexible portion 13 may be fixed longitudinally and transversely in contact with the rigid portion 1, the position of which is invariable.

The electrical junction between the rigid portion 1 and the flexible portion 13 is obtained by a vice 32 comprising a mobile jaw 33 and a fixed jaw 34 bearing on the external faces of the conducting elements 4 and 18. The mobile jaw 33 is conducting and creates the electrical connection between corresponding conducting elements 4 and 18 and that are not directly connected to each other; it overlaps these conducting elements 4 and 18 and remains separate from them, and can be disassembled; the fixed jaw 34 is fixed to the protuberance 29. A clamping bolt 35 holds them close to each other when it is tight, by pressing the mobile jaw 33 into contact with the conducting elements 4 and 18. When it is loose, the mobile jaw is released and the conducting elements 4 and 18 can be separated. The clamping bolt is at the same electrical potential as the fixed jaw 34 and the protuberance 29, but is electrically separated from the mobile jaw 33 through an insulating dish 37 between the mobile jaw 33 and a nut 36 of the clamping bolt 35. A sleeve 37 surrounds the stem of the clamping bolt 35 and comprises a support collar on the protuberance 29.

Therefore, electricity is transmitted through the protuberance 29 for a pair of a conducting elements 4 and 18 and through the conducting jaw 33 for the other pair of conducting elements. A movement of the vitrification crucible 14 within the defined limits is felt by conductors 18 of the flexible portion 13 slipping on the lateral face 30 of the protuberance 29 or on the conducting jaw 33, without the contact being broken and conduction being interrupted, and by bending of the flexible connector 17 as already mentioned, for a horizontal or vertical displacement.

The end pieces 10 and 21 of the portions 1 and 13 are attached by curved connectors 38 that can easily be connected onto end pieces 10 and 21 by a remote manipulated tool. The connectors 38 are flexible and an electrical insulation covers their entire outside face. Advantageously, they are placed on the same side of the segments so that they can be put into place and removed more easily. They comprise rings 39 that fit onto end pieces 10 and 21 creating a click fit that releases valves not shown in the end pieces 10 and 21 and in the connectors 38 to open the channel communication. These valves close automatically when the connectors 38 are removed, therefore closing the channels and preventing leaks. Such systems are known in the field of hydraulic connections, so they will not be described further herein.

The invention claimed is:

1. Device for transmission of electricity, comprising at least one electricity conducting element, composed essentially of a rigid and elongated section, the conducting element comprising two segments separated by a connection composed of flexible electricity conducting elements, characterised in that it comprises a joint support device for the two segments, and the flexible elements are metallic tubes brazed onto segments of the conducting element.

2. Electricity transmission device according to claim 1, in which the conducting element is fitted with cooling channels, characterised in that the tubes are connected to said cooling channels, themselves being structurally and electrically integrated into the section.

3. Electricity transmission device according to claim 1, in which the conducting element is made of copper, characterised in that the flexible elements are made of steel or copper.

4. Electricity transmission device according to claim 1, characterised in that the joint support of the two segments comprises a pulley block with swing arm, the segments being suspended at opposite ends of the swing arm.

5. Electricity transmission device according to claim 1, characterised in that the segments comprise corresponding support stands.

6. Electricity transmission device according to claim 1, characterised in that the segments are surrounded by corresponding electromagnetic shielding covers that overlap in front of the flexible elements.

7. Electricity transmission device according to claim 1, characterised in that the conducting element comprises a third segment provided with cooling channels, said cooling channels being made on the surface of the third segment and with a wave shape, the third segment comprises ionising radiation screens aligned with straight line portions of cooling channels, an electromagnetic shielding cover comprising an outside adjustment surface that surrounds the third segment, and a filling shell that extends between the third segment and the electromagnetic shielding cover.

8. Electricity transmission device according to claim 1, characterised in that the conducting element comprises at least one third segment prolonging another of the segments, and a connector for connecting the prolonged segments comprising a vice with clamping jaws, said segments being prolonged.

9. Electricity transmission device according to claim 8, characterised in that the segments comprise connection parts being joined together by contact faces sliding along a direction in which segments being prolonged are elongated and superposed in a jaw closing direction.

10. Electricity transmission device according to claim 8, characterised in that at least one of the jaws is conducting and sets up an electrical connection by overlapping prolonged segments and being separate from them.

11. Electricity transmission device according to claim 9, in which segments are fitted with cooling channels, characterised in that the cooling channels of the extended segments are connected with separable connectors.

12. Electricity transmission device according to claim 11, characterised in that the separable connectors and cooling channel end pieces of segments are fitted with self-closing valves when the connectors are separated from the end pieces.

13. Electricity transmission device according to claim 4, characterised in that the pulley block with swing arm is removable from the segments.

14. Assembly comprising an electricity power supply, an instrument powered by said power supply, and an electricity transmission device, including at least one electricity conducting element, composed essentially of a rigid and elongated section, the conducting element comprising two segments separated by a connection composed of flexible electricity conducting elements, characterised in that it comprises a joint support device for the two segments, and the flexible elements are metallic tubes brazed onto segments of the conducting element, the electricity transmission device passing through a biological protection chamber in which the instrument and the connector composed of flexible electricity conducting elements are placed.

* * * * *